(12) United States Patent
Kuno et al.

(10) Patent No.: US 8,312,524 B2
(45) Date of Patent: Nov. 13, 2012

(54) CARD MANAGEMENT DEVICE AND CARD MANAGEMENT SYSTEM

(75) Inventors: Hiroshi Kuno, Kanagawa (JP); Mitsuru Tanabe, Kanagawa (JP); Koji Yoshimura, Kanagawa (JP); Daisaku Hayashi, Chiba (JP)

(73) Assignee: Sony Corporation, Tokyo (JP)

( * ) Notice: Subject to any disclaimer, the term of this patent is extended or adjusted under 35 U.S.C. 154(b) by 341 days.

(21) Appl. No.: 12/793,733

(22) Filed: Jun. 4, 2010

(65) Prior Publication Data

US 2010/0318790 A1    Dec. 16, 2010

(30) Foreign Application Priority Data

Jun. 11, 2009   (JP) ................................ P2009-139809

(51) Int. Cl.
*G06F 21/20* (2006.01)
*G06F 21/06* (2006.01)
*G06F 21/24* (2006.01)
*G11B 20/10* (2006.01)
*H04L 9/32* (2006.01)

(52) U.S. Cl. .............................. 726/9; 713/185; 235/375

(58) Field of Classification Search .......... 235/375–386; 713/185; 726/9
See application file for complete search history.

(56) References Cited

U.S. PATENT DOCUMENTS

| | | | |
|---|---|---|---|
| 6,748,485 B1 | 6/2004 | Yokota et al. | |
| 7,010,688 B1* | 3/2006 | Kawasaki | 713/168 |
| 7,014,119 B2* | 3/2006 | Sterling | 235/487 |
| 2004/0059916 A1* | 3/2004 | Mizushima et al. | 713/172 |
| 2004/0133800 A1* | 7/2004 | Sterling | 713/200 |
| 2005/0120226 A1* | 6/2005 | Hartel et al. | 713/185 |
| 2006/0255160 A1* | 11/2006 | Winkler | 235/492 |
| 2008/0082825 A1* | 4/2008 | Mizushima et al. | 713/172 |
| 2010/0083006 A1* | 4/2010 | So et al. | 713/193 |
| 2010/0153746 A1* | 6/2010 | Takeuchi et al. | 713/193 |
| 2010/0275036 A1* | 10/2010 | Harada et al. | 713/189 |
| 2011/0299679 A1* | 12/2011 | Yamaguchi et al. | 380/44 |
| 2012/0023329 A1* | 1/2012 | Yamamoto et al. | 713/158 |

FOREIGN PATENT DOCUMENTS

| | | |
|---|---|---|
| JP | 4207335 | 10/2008 |
| WO | WO 2008146476 A1 * | 12/2008 |
| WO | WO 2010035449 A1 * | 4/2010 |

* cited by examiner

*Primary Examiner* — Christian Laforgia
(74) *Attorney, Agent, or Firm* — Frommer Lawrence & Haug LLP; William S. Frommer

(57) ABSTRACT

A card management device includes: a card device configured to include a controller on which a cryptographic IP is mounted in advance; and an individual information writing device configured to allow the card device to be connected to the individual information writing device in such a way that the card device is capable of data transfer to the individual information writing device, individual information assigned to the card device in advance being set in the individual information writing device, the individual information writing device being capable of writing the individual information to the card device connected to the individual information writing device.

20 Claims, 18 Drawing Sheets

| KIND | VALUE |
| --- | --- |
| EXPIRATION DATE | 2009/05/15 23:59:59 |
| THE MAXIMUM NUMBER OF TIMES OF ISSUE | 100000 |

※CONDITION CAN BE OMITTED (INDEFINITE PERIOD, LIMIT TO THE NUMBER OF TIMES IS ABSENT)

FIG. 9A CONFIGURATION EXAMPLE 1

| Media ID | SECRET KEY FOR CONTENT PROTECTION | ... | USED |
|---|---|---|---|
| 00000000 FFFFFFFF 12345678 00000001 | AD124EDC EFFF7721 90821AB4 ED0081AD | ... | V |
| 00000000 FFFFFFFF 12345678 00000002 | CC326478 D910AC34 BD482DA0 C8E3E45B | ... | V |
| 00000000 FFFFFFFF 12345678 00000003 | 910ADF64 EF55ACB1 89ADCBE1 33AADDFF | ... |  |
| ... | ... | ... | ... |

※DATA ON ONE ROW IN ABOVE TABLE IS INFORMATION TO BE RECORDED IN ONE MEMORY CARD

FIG. 9B CONFIGURATION EXAMPLE 2 (SIMPLE PATTERN INCLUDING ONLY Media ID)

PREFIX VALUE OF ASSIGNABLE Media ID: 00000000 FFFFFFFF 12345678 → FIXED VALUE

Media ID ASSIGNED NEXT: 00000002 → INCREMENTED IN ISSUE COMPLETION PROCESSING (RENDERED UNUSABLE WHEN ISSUE OF FFFFFFFFh IS COMPLETED)

Media ID TO BE ISSUED: 00000000 FFFFFFFF 12345678 00000002

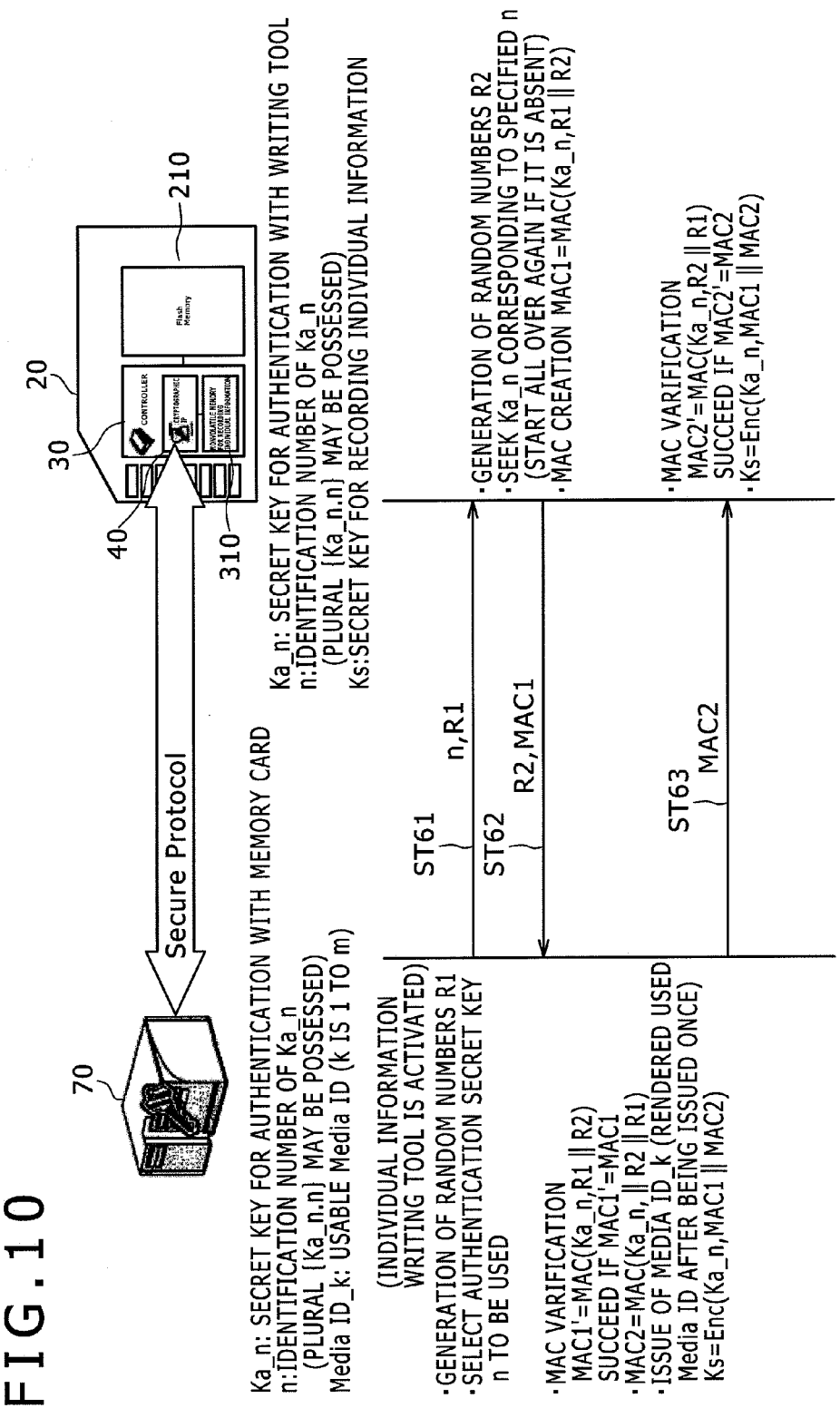

FIG.11

| KEY NUMBER K | SECRET KEY FOR AUTHENTICATION |
|---|---|
| 1 | 9C234EDC AACC7721 90821AB4 ED3381A1 |
| 2 | 012AE34B CE357212 899ADDFF EE43e521 |
| 3 | 12174626 AF8812AC BEEE4467 33E3FFA1 |
| : | : |
| | |

※LIST OF ANY DATA ALLOWING
   SPECIFICATION OF KEY, SUCH
   AS HASH VALUE

CARD MANAGEMENT DEVICE AND CARD MANAGEMENT SYSTEM

BACKGROUND OF THE INVENTION

1. Field of the Invention

The present invention relates to a card management device and a card management system for managing a card device such as a memory card so that illegal manufacturing of the card device may be prevented.

2. Description of the Related Art

In general, for recording content of moving image, music, etc. in a memory card in such a way that the content cannot be illegally copied, the content protection function of the memory card is utilized.

As shown in FIG. 1, a memory card manufacturer MM1 receives all of the data necessary to manufacture the memory card from a memory card licenser ML1.

The memory card manufacturer MM1 also receives e.g. a unique ID (Media ID) as individual information of the medium and a secret key etc. used in the content protection function.

Naturally, in general, the memory card manufacturer MM1 is obliged to never illegally manufacture the memory card based on the license agreement of the memory card.

SUMMARY OF THE INVENTION

However, the illegal copy of content is technically possible if the memory card manufacturer MM1 manufactures a memory card enabling illegal copy separately from the content protection function by conducting the following acts.

For example, as one act, the memory card manufacturer MM1 illegally manufactures a clone of the memory card, i.e. a memory card having entirely the same individual information of the memory card. As another act, the memory card manufacturer MM1 provides any backdoor enabling illegal copy in the content protection function.

As described above, the memory card manufacturer MM1 is obliged to never illegally manufacture the memory card based on the license agreement of the memory card.

However, the memory card manufacturer MM1 receives all of the data necessary to manufacture the memory card as described above.

Therefore, for example, the memory card manufacturer MM1 can illegally manufacture the memory card having the same secret information, and can continue to manufacture illegal media even after the license agreement has become invalid in principle, although these acts correspond to a breach of the agreement.

There is a need for the present invention to provide a card management device and a card management system capable of inhibiting manufacturing of an illegal card device and therefore capable of preventing illegal copy of content.

According to an embodiment of the present invention, there is provided a card management device including a card device configured to include a controller on which a cryptographic IP is mounted in advance, and an individual information writing device configured to allow the card device to be connected to the individual information writing device in such a way that the card device is capable of data transfer to the individual information writing device. Individual information assigned to the card device in advance is set in the individual information writing device. The individual information writing device is capable of writing the individual information to the card device connected to the individual information writing device. In the card management device, a nonvolatile memory for individual information recording is formed in the controller of the card device, and the individual information given from the individual information writing device is written to the nonvolatile memory for individual information recording. Furthermore, authentication information for cryptographic authentication with the individual information writing device connected to the card device is set as the cryptographic IP in the controller, and the controller has a function to encrypt individual information given from the individual information writing device and write the individual information to the nonvolatile memory for individual information recording if a positive authentication result is obtained in authentication processing with the individual information writing device. In addition, the individual information writing device has a function to execute the authentication processing with the controller of the card device connected to the individual information writing device, and transfers individual information of the card device to the controller of the card device to make the transferred individual information be written to the nonvolatile memory for individual information recording if a positive authentication result is obtained in the authentication processing.

According to another embodiment of the present invention, there is provided a card management system including an activation server configured to be capable of communicating at least activation information, a card device configured to include a controller on which a cryptographic IP is mounted in advance, and an individual information writing device configured to allow the card device to be connected to the individual information writing device in such a way that the card device is capable of data transfer to the individual information writing device. Individual information assigned to the card device in advance is set in the individual information writing device. The individual information writing device is capable of writing the individual information to the card device connected to the individual information writing device and is capable of communication with the activation server. In the card management system, a nonvolatile memory for individual information recording is formed in the controller of the card device, and the individual information given from the individual information writing device is written to the nonvolatile memory for individual information recording. Furthermore, authentication information for cryptographic authentication with the individual information writing device connected to the card device is set as the cryptographic IP in the controller, and the controller has a function to encrypt individual information given from the individual information writing device and write the individual information to the nonvolatile memory for individual information recording if a positive authentication result is obtained in authentication processing with the individual information writing device. In addition, the individual information writing device has a function to execute the authentication processing with the controller of the card device connected to the individual information writing device, and transfers individual information of the card device to the controller of the card device to make the transferred individual information be written to the nonvolatile memory for individual information recording if a positive authentication result is obtained in the authentication processing.

The embodiments of the present invention can inhibit manufacturing of an illegal card device and therefore can prevent illegal copy of content.

BRIEF DESCRIPTION OF THE DRAWINGS

FIGS. 9A and 9B are diagrams showing configuration examples of individual information according to the embodiment;

FIG. 10 is a diagram showing the flow of processing of authentication and session key generation according to the embodiment;

FIG. 11 is a diagram showing one example of an authentication key;

DETAILED DESCRIPTION OF THE PREFERRED EMBODIMENT

An embodiment of the present invention will be described below in association with the drawings.

The description will be made in the following order.
1. Configuration Example of Card Management System
2. Configuration Example of Memory Card of Card Management Device
3. First Configuration Example of Individual Information (Media ID) Writing Device (Tool) of Card Management Device
4. Second Configuration Example of Individual Information (Media ID) Writing Device (Tool) of Card Management Device <1. Configuration Example of Card Management System>

Figure 1:
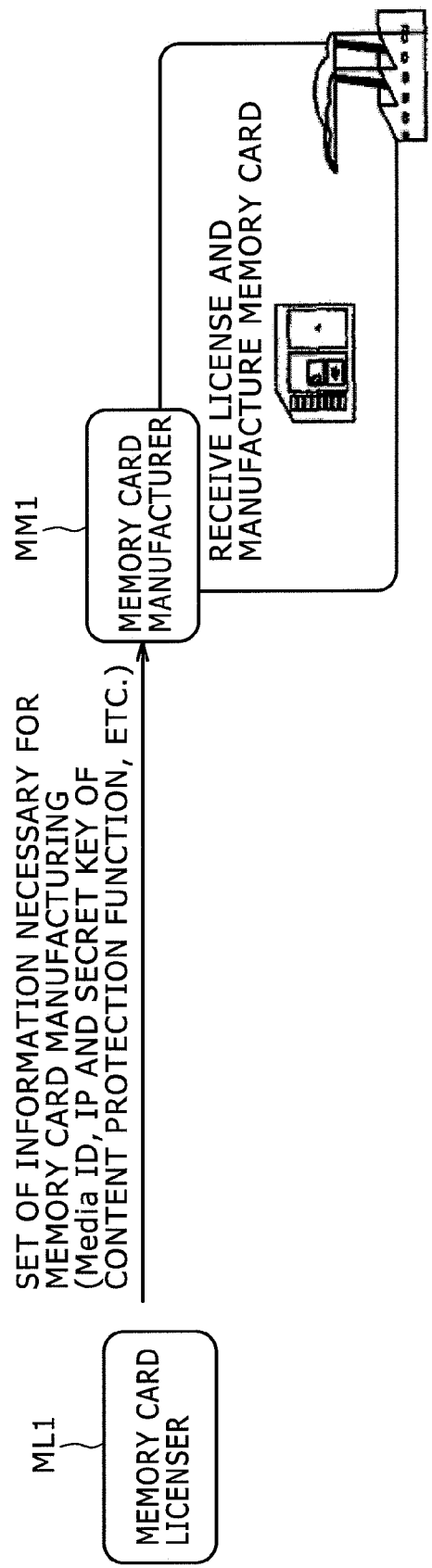
FIG. 1 is a diagram schematically showing the control flow of general memory card manufacturing.
Figure 2:
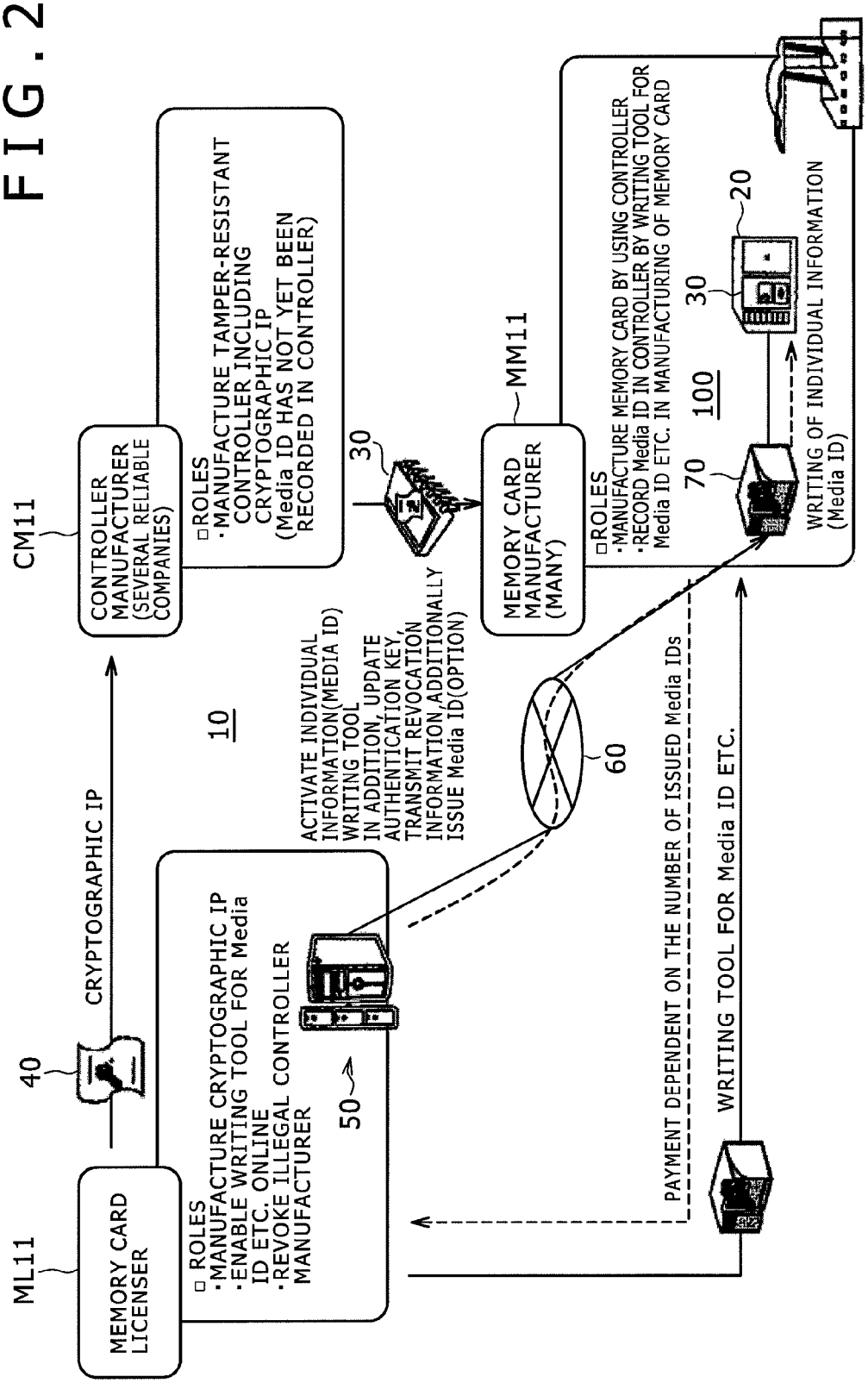
FIG. 2 is a diagram showing a configuration example of a card management system involved in manufacturing management of a card device according to an embodiment of the present invention.

FIG. 2 is a diagram showing a configuration example of a card management system involved in manufacturing management of a card device according to an embodiment of the present invention.

This card management system 10 is configured as a system capable of managing the manufacturing of a memory card 20 as the card device.

The card management system 10 basically includes a memory card licenser section ML11, a controller manufacturer section CM11, and a memory card manufacturer section MM11 involved in the manufacturing and management of the memory card.

The memory card licenser section ML11 manufactures a cryptographic intellectual property (IP) 40 as a cryptographic processing function part formed in a controller 30 of the memory card 20.

The cryptographic IP 40 manufactured by the memory card licenser section ML11 is supplied to the controller manufacturer section CM11 as one of several reliable companies.

The memory card licenser section ML11 has a function to revoke an illegal controller manufacturer.

The memory card licenser section ML11 has an activation server 50.

The activation server 50 has a function to enable (activate) a writing tool 70 for individual information such as the Media ID given to the memory card manufacturer section MM11, online via a network 60 formed of a dedicated line or a public line.

The individual information includes the Media ID etc. That is, the individual information is not limited to only the Media ID. However, in FIG. 2, the individual information is shown as the Media ID for easy understanding.

The activation server 50 has functions of updating of the authentication key included in the cryptographic IP 40, transmission of revocation information, additional issue of the individual information (Media ID etc.), and so forth for the individual information (Media ID) writing tool 70 via the network 60.

In this manner, the activation server 50 has a function to manage the individual information writing tool 70 included in a card management device 100 online.

In the controller manufacturer section CM11, the tamper-resistant controller 30 including the cryptographic IP 40 supplied from the memory card licenser section ML11 is manufactured.

However, the Media ID is not recorded in the controller 30 manufactured in the controller manufacturer section CM11.

The controller 30 manufactured in the controller manufacturer section CM11 is supplied to the memory card manufacturer section MM11.

In the memory card manufacturer section MM11, the memory card 20 is manufactured by using the controller 30 manufactured in the controller manufacturer section CM11.

In the memory card manufacturer section MM11, in the manufacturing of the memory card, the individual information (Media ID etc.) is recorded (written) in the controller 30 by the individual information (Media ID) writing tool 70.

In this manner, the card management device 100 according to the embodiment of the present invention is formed by the memory card 20 manufactured in the memory card manufacturer section MM11 and the Media ID writing tool 70.

The card management system 10 having the above-described configuration has the following characteristics.

The card management system 10 separates the controller manufacturer from the memory card manufacturer to thereby make it difficult for the memory card manufacturer to manufacture the illegal memory card 20.

By limiting the controller manufacturer to several reliable companies in business, a risk that the controller manufacturer commits an illegal conduct can be reduced. Even if the controller manufacturer has committed an illegal conduct, the manufacturing can be stopped by revoking the controller manufacturer.

Moreover, even if the memory card manufacturer has committed any illegal conduct, the manufacturing of the memory card 20 can be stopped by stopping the supply of the controller 30 or not activating the Media ID writing tool 70.

Furthermore, as a collateral effect, there is an advantage that the manufacturing cost of the controller can be reduced because the individual information does not need to be written in the manufacturing of the controller.

In addition, for example the memory card licenser section ML11 can directly collect the cost of the issue of the individual information such as the Media ID from the memory card manufacturer.

Therefore, it is possible for the controller manufacturer to set an elastic price for the controller 30 without adding the cost of the issue of the Media ID to the price of the controller 30.

A description will be made below about the specific configuration and functions of the card management device 100 as the main constituent unit for realizing the above-described characteristics of this card management system 10.

The card management device 100 is composed of the memory card 20 as the card device and the individual information writing tool 70 as described above.

First, the configuration and functions of the memory card 20 will be described below.

<2. Configuration Example of Memory Card of Card Management Device>

Figure 3:
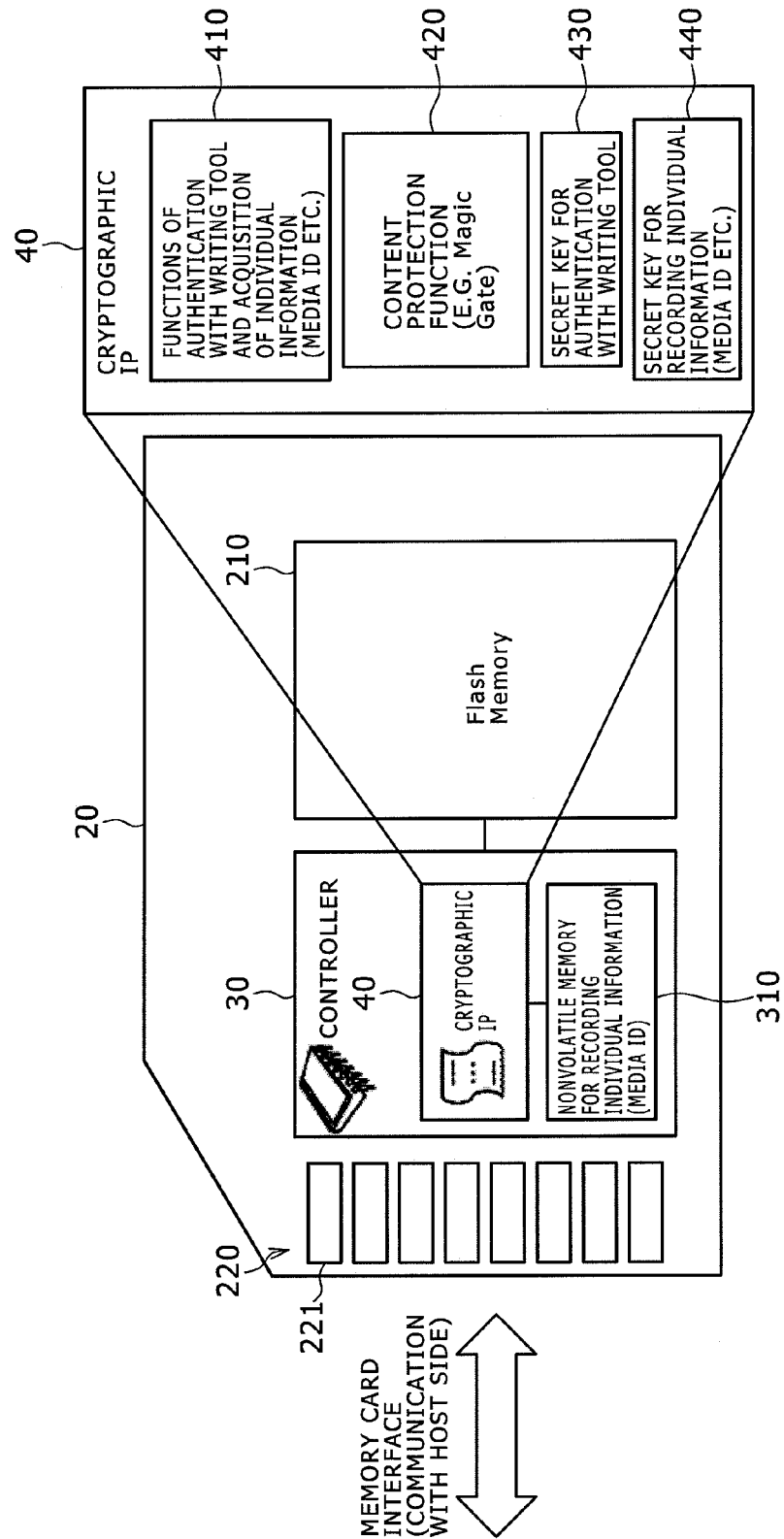
FIG. 3 is a diagram showing a configuration example of a memory card according to the embodiment of the present invention.

FIG. 3 is a diagram showing a configuration example of the memory card according to the embodiment of the present invention.

The memory card 20 has the controller 30, which is manufactured in the controller manufacturer section CM11 in advance and supplied, a flash memory 210 as a nonvolatile memory for storage, and a memory interface 220 for communication with a host or the individual information writing tool 70.

The memory interface 220 includes a connection terminal 221. In FIG. 3, diagrammatical representation of functional blocks of the memory interface 220 is omitted.

The memory card 20 can be connected to a host or the individual information writing tool 70 via the memory interface 220 in such a way that data can be transmitted to the host or the individual information writing tool 70.

As examples of the host, high-performance apparatus such as personal computers (PCs), video camcorders, and digital cameras can be cited.

In other words, the memory card 20 is used as a removable medium for the high-performance apparatus such as PCs, video camcorders, and digital cameras.

The memory card 20 has the flash memory 210 as the main storage area.

The controller 30 has functions to control the interface for communication with the host or the individual information writing tool 70 and control access to the flash memory 210.

Furthermore, the controller 30 includes the cryptographic IP 40 supplied from the memory card licenser section ML11 to the controller manufacturer section CM11 and a nonvolatile memory 310 for recording individual information (Media ID etc.).

The cryptographic IP 40 functions as a cryptographic processing function part.

The cryptographic IP 40 includes an authentication function, a secret key, etc. given in the memory card licenser section ML11 in advance.

As shown in FIG. 3, the cryptographic IP 40 has a part 410 having functions of authentication with the individual information writing tool 70 and acquisition of individual information (Media ID etc.), and a content protection function part 420.

The cryptographic IP 40 further has a secret key 430 for authentication with the Media ID writing tool 70 and a secret key 440 for recording individual information such as the Media ID.

As just described, in the controller 30, the function for carrying out cryptographic authentication with the individual information writing tool 70 for writing the Media ID etc. as individual information and the secret keys as the authentication information are set in the controller manufacturer section CM11 in advance.

Upon the connection of the memory card 20 to the Media ID writing tool 70, the controller 30 gives and receives the data, such as random numbers, for authentication with the Media ID writing tool 70 via the memory interface 220.

If the positive authentication result is obtained in the cryptographic authentication processing, the controller 30 encrypts the Media ID (individual information) given from the Media ID writing tool 70 and writes it in the nonvolatile memory 310 for recording individual information (Media ID).

The data recorded in the nonvolatile memory 310 for individual information recording includes not only the Media ID but also data recorded on a medium-by-medium basis, such as a secret key used by a cryptographic application of the cryptographic IP 40.

<3. First Configuration Example of Individual Information Writing Tool of Card Management Device>

Figure 4:
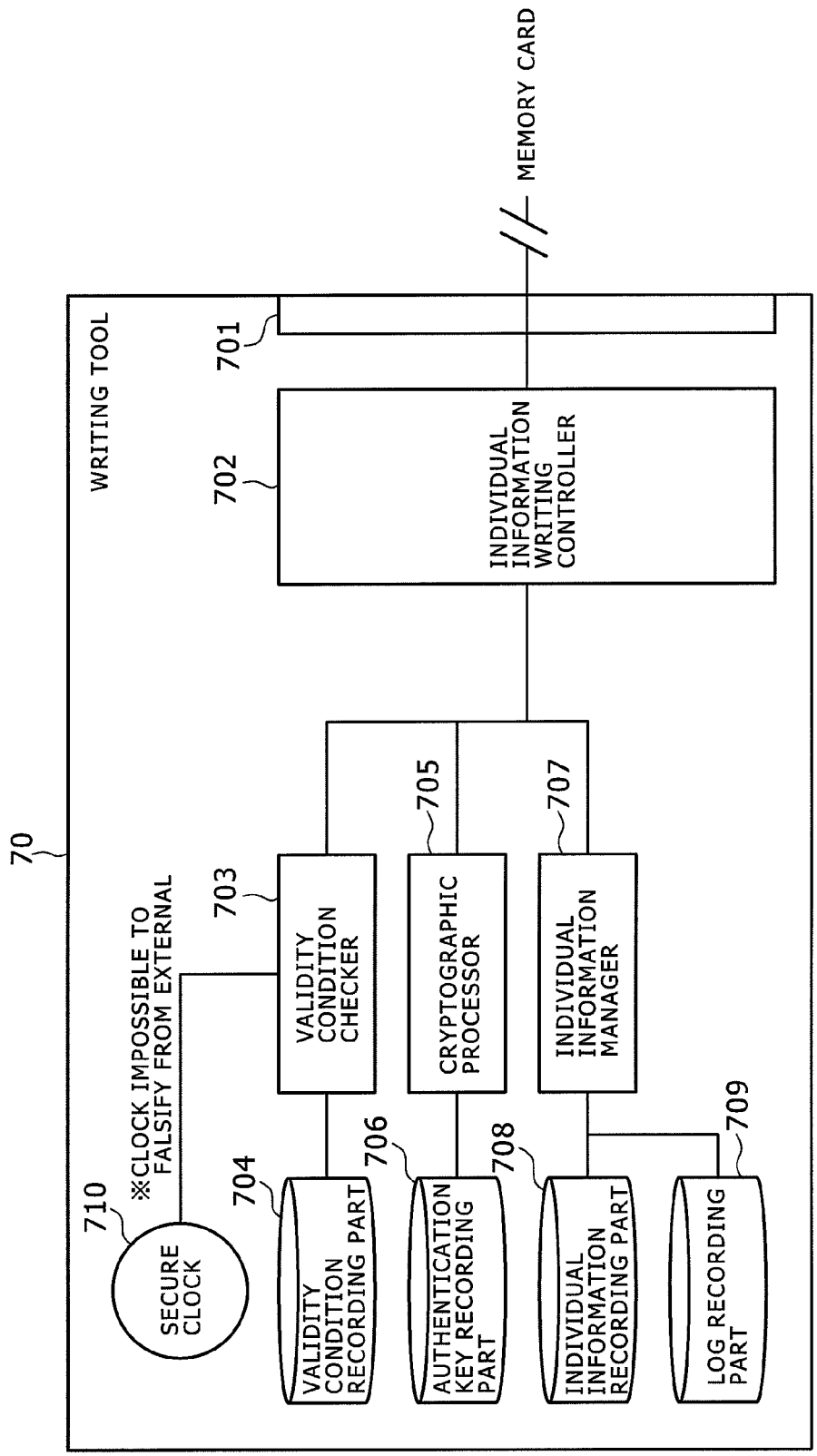
FIG. 4 is a block diagram showing a configuration example of an individual information writing tool according to the embodiment of the present invention.

FIG. 4 is a block diagram showing a first configuration example of the individual information writing tool according to the embodiment of the present invention.

FIG. 4 shows a configuration example of the writing function blocks of the individual information writing tool 70.

It is also possible to form the individual information writing tool 70 as a dedicated individual tool. However, for example it may be a device based on a PC or may be a device like a USB (universal serial bus) dongle.

The individual information writing tool 70 in FIG. 4 has a connector part 701 to which the terminal 221 of the memory card 20 is connected, an individual information writing controller 702, a validity condition checker 703, a validity condition recording part 704, a cryptographic processor 705, and an authentication key recording part 706.

The Media ID writing tool 70 has an individual information manager 707, an individual information recording part 708, a log recording part 709, and a secure clock 710 that is a clock impossible to falsify from the external.

The individual information writing controller 702 has functions to issue a request for check of the validity condition to the validity condition checker 703 and check whether or not the availability of the individual information is present via the individual information manager 707, upon confirming that the terminal 221 of the memory card 20 is connected to the connector part 701.

Upon confirming the availability of the individual information, the individual information writing controller 702 starts authentication via the cryptographic processor 705 and controls authentication processing with the cryptographic IP 40 in the controller 30 of the memory card 20 in accordance with the authentication protocol. This authentication processing is executed by the cryptographic processor 705.

If the positive authentication result is obtained, the individual information writing controller 702 executes processing of acquiring individual information (Media ID etc.) via the individual information manager 707, and carries out encryption control of the individual information by the cryptographic processor 705.

After the individual information is encrypted, the individual information writing controller 702 carries out control of transferring the encrypted individual information to the memory card 20 and making it be written in the nonvolatile memory 310.

In response to the request for check of the validity condition from the individual information writing controller 702, the validity condition checker 703 determines whether or not the current status satisfies the validity condition recorded in the validity condition recording part 704, and informs the individual information writing controller 702 of the result of the determination.

Upon receiving the authentication start command by the individual information writing controller 702, the cryptographic processor 705 executes the following encryption processing.

The cryptographic processor 705 executes the authentication processing with the cryptographic IP 40 in the controller 30 of the memory card 20 in accordance with the authentication protocol with reference to recorded data in the authentication key recording part 706, and informs the individual information writing controller 702 of the authentication result.

The cryptographic processor 705 carries out authentication and session key generation in accordance with the authentication protocol.

Upon receiving the request for check of the availability of the individual information from the individual information writing controller 702, the individual information manager 707 checks the use status of the individual information in the individual information recording part 708 and checks whether or not the availability of the individual information is present, to inform the individual information writing controller 702 of the result of the check.

Upon receiving a request for acquisition of individual information from the individual information writing controller 702, the individual information manager 707 outputs individual information such as an unused Media ID in the individual information recording part 708 to the individual information writing controller 702.

Upon receiving information indicating that the issue of the individual information has been completed from the individual information writing controller 702, the individual information manager 707 updates the individual information issued by the individual information recording part 708 to the used individual information, and records the log in the log recording part 709.

The individual information manager 707 increments the log in the log recording part 709 for example.

[Writing Processing by Individual Information Writing Tool]

Processing of writing individual information by the individual information writing tool 70 according to the present embodiment will be described below in association with FIG. 5 to FIG. 14.

Figure 5:
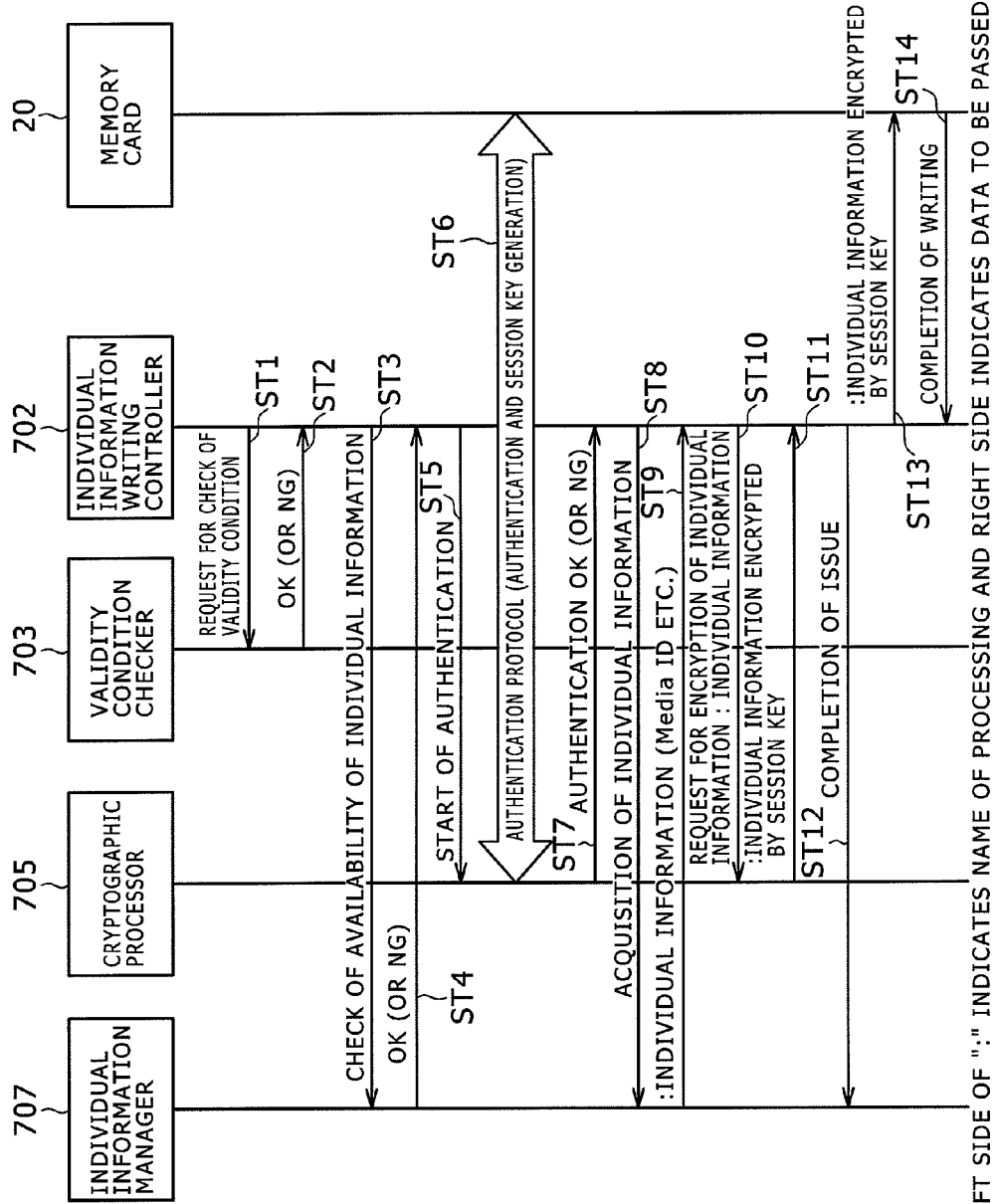
FIG. 5 is a diagram showing the flow of processing of writing individual information by the individual information writing tool according to the embodiment.

FIG. 5 is a diagram showing the flow of the processing of writing individual information by the individual information writing tool according to the present embodiment.

Upon confirming that the terminal 221 of the memory card 20 is connected to the connector part 701, the individual information writing controller 702 issues the request for check of the validity condition to the validity condition checker 703 (ST1).

Upon receiving the request for check of the validity condition from the individual information writing controller 702, the validity condition checker 703 determines whether or not the current status satisfies the validity condition recorded in the validity condition recording part 704, and informs the individual information writing controller 702 of the determination result (ST2).

Figures 6, 7:
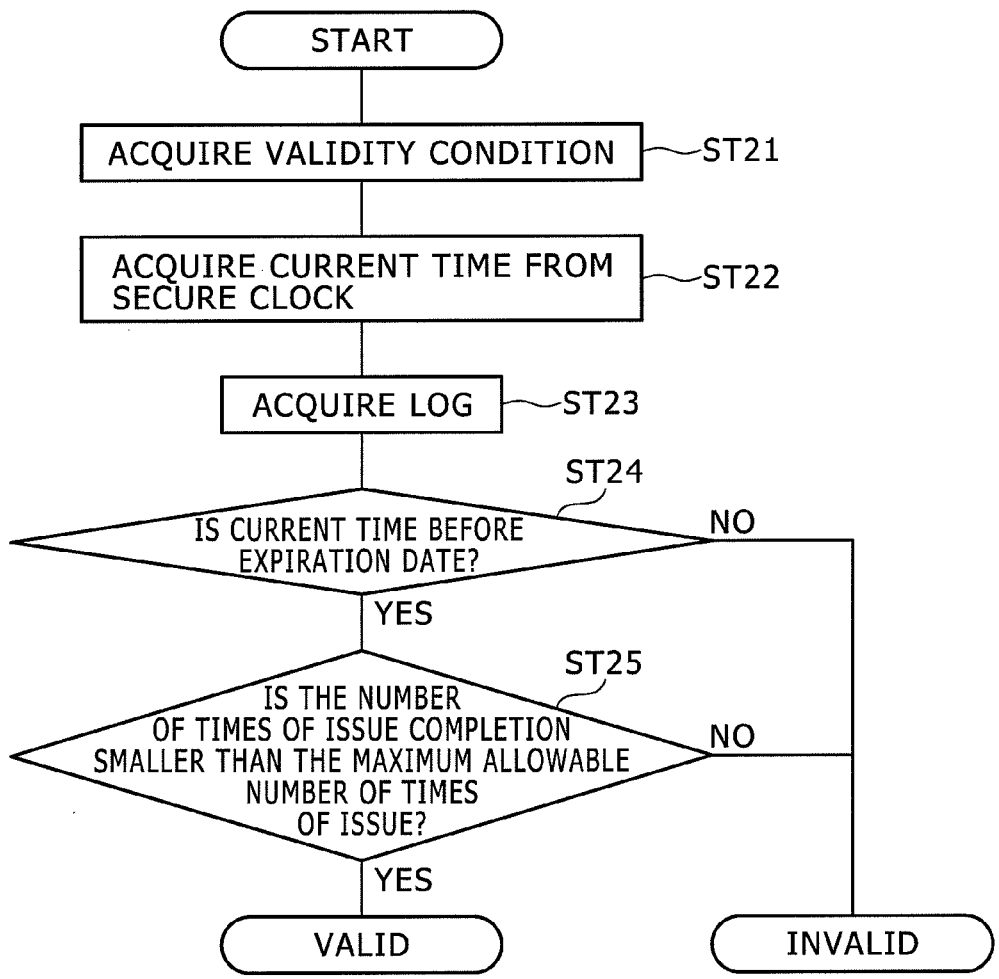
FIG. 6 is a diagram showing the flow of validity check processing by a validity condition checker according to the embodiment.
FIG. 7 is a diagram showing a description example of the validity condition in a validity condition recording part.

FIG. 6 is a diagram showing the flow of the validity check processing by the validity condition checker according to the present embodiment.

FIG. 7 is a diagram showing a description example of the validity condition in the validity condition recording part.

In FIG. 7, as an example of the validity condition, the expiration date and the maximum number of times of issue of the individual information are shown. In this example, the expiration date is set to "May 15, 2009, 23:59:59," and the maximum number of times of issue is set to "100000."

Upon receiving the request for check of the validity condition from the individual information writing controller 702, the validity condition checker 703 acquires the validity condition from the validity condition recording part 704 (ST21).

The validity condition checker 703 acquires the current time from the secure clock 710 (ST22), and acquires the log from the log recording part 709 (ST23).

Next, the validity condition checker 703 determines whether or not the current time acquired from the secure clock 710 is before the expiration date (ST24).

If it is determined in the step ST24 that the acquired current time is before the expiration date, the validity condition checker 703 determines whether or not the number of times of issue completion according to the log is smaller than the maximum number of times of issue (ST25).

If it is determined in the step ST25 that the number of times of issue completion is smaller than the maximum number of times of issue, the validity condition checker 703 informs the individual information writing controller 702 of that the current status satisfies the validity condition and is valid (OK).

If it is determined in the step ST24 that the current time is not before the expiration date or it is determined that the number of times of issue completion is not smaller than the maximum number of times of issue, the validity condition checker 703 informs the individual information writing controller 702 of that the current status does not satisfy the validity condition and is invalid (NG).

Referring back to the processing of FIG. 5, the individual information writing controller 702 informed of that the validity condition is satisfied issues a request for checking whether unused individual information is present and thus the availability thereof is present to the individual information manager 707 (ST3).

Upon receiving the request for check of the availability of the individual information, the individual information manager 707 checks the use status of the individual information in the individual information recording part 708 and checks whether or not the availability of the individual information is present, to inform the individual information writing controller 702 of the result of the check (ST4).

Figure 8:
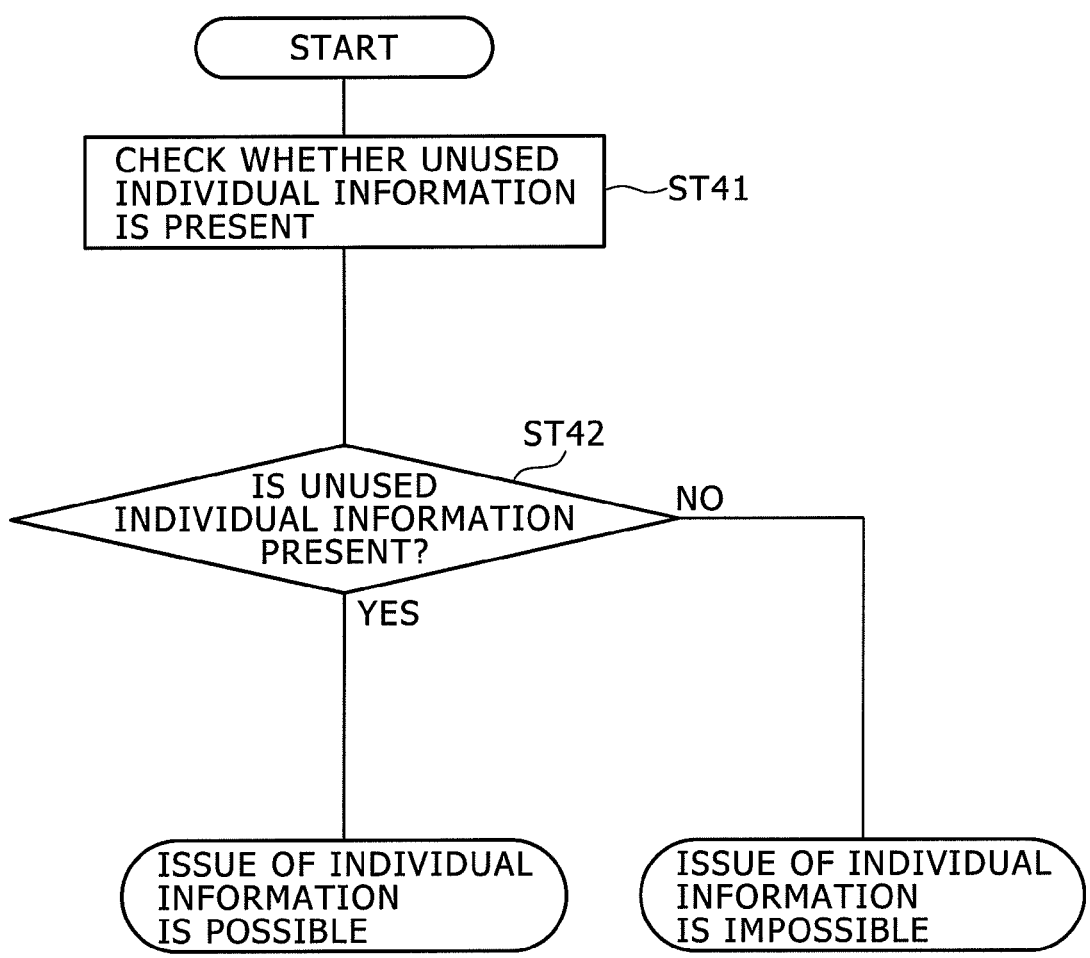
FIG. 8 is a diagram showing the flow of processing of checking the availability of individual information by an individual information manager according to the embodiment.

FIG. 8 is a diagram showing the flow of processing of check of the availability of the individual information by the individual information manager according to the present embodiment.

The individual information manager 707 checks the individual information recorded in the individual information recording part 708 (ST41), and determines whether or not unused individual information is present (ST42).

If it is determined in the step ST42 that unused individual information is present, the individual information manager 707 informs the individual information writing controller 702 of that the issue of individual information is possible (OK).

On the other hand, if it is determined in the step ST42 that unused individual information is not present, the individual information manager 707 informs the individual information writing controller 702 of that the issue of individual information is impossible (NG).

FIGS. 9A and 9B are diagrams showing configuration examples of the individual information according to the present embodiment.

FIG. 9A shows a first configuration example of the individual information.

This example includes "Media ID" 7081 and "secret key for content protection" 7082 as the individual information.

Furthermore, the example includes a field 7083 to which information indicating whether the individual information has been used is written.

In FIG. 9A, as for the individual information on the first row, the Media ID is "00000000 FFFFFFFF 12345678 00000001," and the secret key for content protection is "AD124EDC EFFF7721 90821AB4 ED0081AD." This individual information has been used.

As for the individual information on the second row, the Media ID is "00000000 FFFFFFFF 12345678 00000002," and the secret key for content protection is "CC326478 D910AC34 BD482DA0 C8E3E45B." This individual information has been used.

As for the individual information on the third row, the Media ID is "00000000 FFFFFFFF 12345678 00000003," and the secret key for content protection is "910ADF64 EF55ACB1 89ADCBE1 33AADDFF." This individual information is unused.

In FIG. 9B, a simple pattern including only the Media ID as the individual information is shown.

In this example, the prefix value of the assignable Media ID is set to a fixed value of "00000000 FFFFFFFF 12345678."

The Media ID assigned next is "00000002" and is incremented at the time of issue completion processing. In this case, the Media ID is rendered unusable when issue of "FFFFFFFFh" is completed.

The Media ID to be issued is "00000000 FFFFFFFF 12345678 00000002."

Referring back to the processing of FIG. 5, when the availability of the individual information is confirmed, the individual information writing controller 702 issues an authentication start command to the cryptographic processor 705 (ST5).

Upon receiving the authentication start command by the individual information writing controller 702, the cryptographic processor 705 executes authentication processing with the cryptographic IP 40 in the controller 30 of the memory card 20 in accordance with the authentication protocol with reference to the recorded data in the authentication key recording part 706 (ST6).

The cryptographic processor 705 carries out authentication and session key generation in accordance with the authentication protocol.

The cryptographic processor 705 informs the individual information writing controller 702 of the authentication result (ST7).

FIG. 10 is a diagram showing the flow of processing of authentication and session key generation according to the present embodiment.

FIG. 11 is a diagram showing one example of the authentication key.

In this case, the individual information writing tool 70 has Ka_n as the secret key for authentication with the memory card 20, n as the identification number of Ka_n (plural {Ka_n. n} may be possessed), and Media ID_k as the usable Media ID (k is 1 to m).

Similarly, the memory card 20 has Ka_n as the secret key for authentication with the individual information writing tool 70, n as the identification number of Ka_n (plural {Ka_n. n} may be possessed), and Ks as the secret key for recording individual information (Media ID).

In the example of FIG. 11, the authentication secret key of the key number K1 is "9C234EDC AACC7721 90821AB4 ED3381A1."

The authentication secret key of the key number K2 is "012AE34B CE357212 899ADDFF EE43e521."

The authentication secret key of the key number K3 is "12174626 AF8812AC BEEE4467 33E3FFA1."

The processing of FIG. 10 is based on the assumption that the individual information writing tool 70 is enabled (activated) by the activation server 50.

In the individual information writing tool 70, the cryptographic processor 705 generates random numbers R1 and selects the authentication secret key n to be used, to transfer them to the memory card 20 (ST61).

In the memory card 20, the controller 30 generates random numbers R2 and seeks the authentication secret key Ka_n corresponding to the specified n. If it is absent, the processing is started all over again.

Next, the controller 30 of the memory card 20 creates MAC (MAC1=MAC(Ka_n, R1∥R2)).

The controller 30 of the memory card 20 transfers the generated random numbers R2 and MAC1 to the individual information writing tool 70 (ST62).

The cryptographic processor 705 in the individual information writing tool 70 carries out MAC verification.

The cryptographic processor 705 determines that the authentication has succeeded if MAC1'=MAC(Ka_n, R1∥R2) and MAC1'=MAC1.

The cryptographic processor 705 creates MAC2. In this case, MAC2=MAC(Ka_n, ∥R2∥R1).

The cryptographic processor 705 issues Media ID_k. The cryptographic processor 705 renders the Media ID_k used Media ID after it is issued once. The cryptographic processor 705 encrypts the secret key Ks for Media ID recording in association with the MAC2 (Ks=Enc(Ka_n, MAC1∥MAC2)).

Subsequently, the cryptographic processor 705 transfers the generated MAC2 to the memory card 20 (ST63).

The controller 30 of the memory card 20 carries out MAC verification.

The controller 30 determines that the authentication has succeeded if MAC2'=MAC(Ka_n, R2∥R1) and MAC2'=MAC2. Furthermore, the controller 30 encrypts the secret key Ks for Media ID recording (Ks=Enc(Ka_n, MAC1∥MAC2)).

Referring back to the processing of FIG. 5, upon being informed of that the authentication is established by the cryptographic processor 705, the individual information writing controller 702 issues a request for acquisition of individual information to the individual information manager 707 (ST8).

The individual information manager 707 that has received the request for acquisition of individual information outputs unused individual information (Media ID etc.) in the individual information recording part 708 to the individual information writing controller 702 (ST9).

The individual information writing controller 702 that has received the individual information issues a request for encryption of the individual information to the cryptographic processor 705 (ST10).

In response to this, the cryptographic processor 705 outputs the individual information encrypted by the session key to the individual information writing controller 702 (ST11).

The individual information writing controller 702 notifies the individual information manager 707 of the completion of the issue of the individual information (ST12), and transfers the individual information encrypted by the session key to the memory card 20 (ST13). The individual information manager 707 executes issue completion processing in response to the notification of the issue completion of the individual information.

In the controller 30 of the memory card 20, the individual information transferred from the individual information writing tool 70 is recorded in the nonvolatile memory 310.

Subsequently, the controller 30 notifies the individual information writing tool 70 of the completion of the writing of the individual information (ST14).

Figure 12:
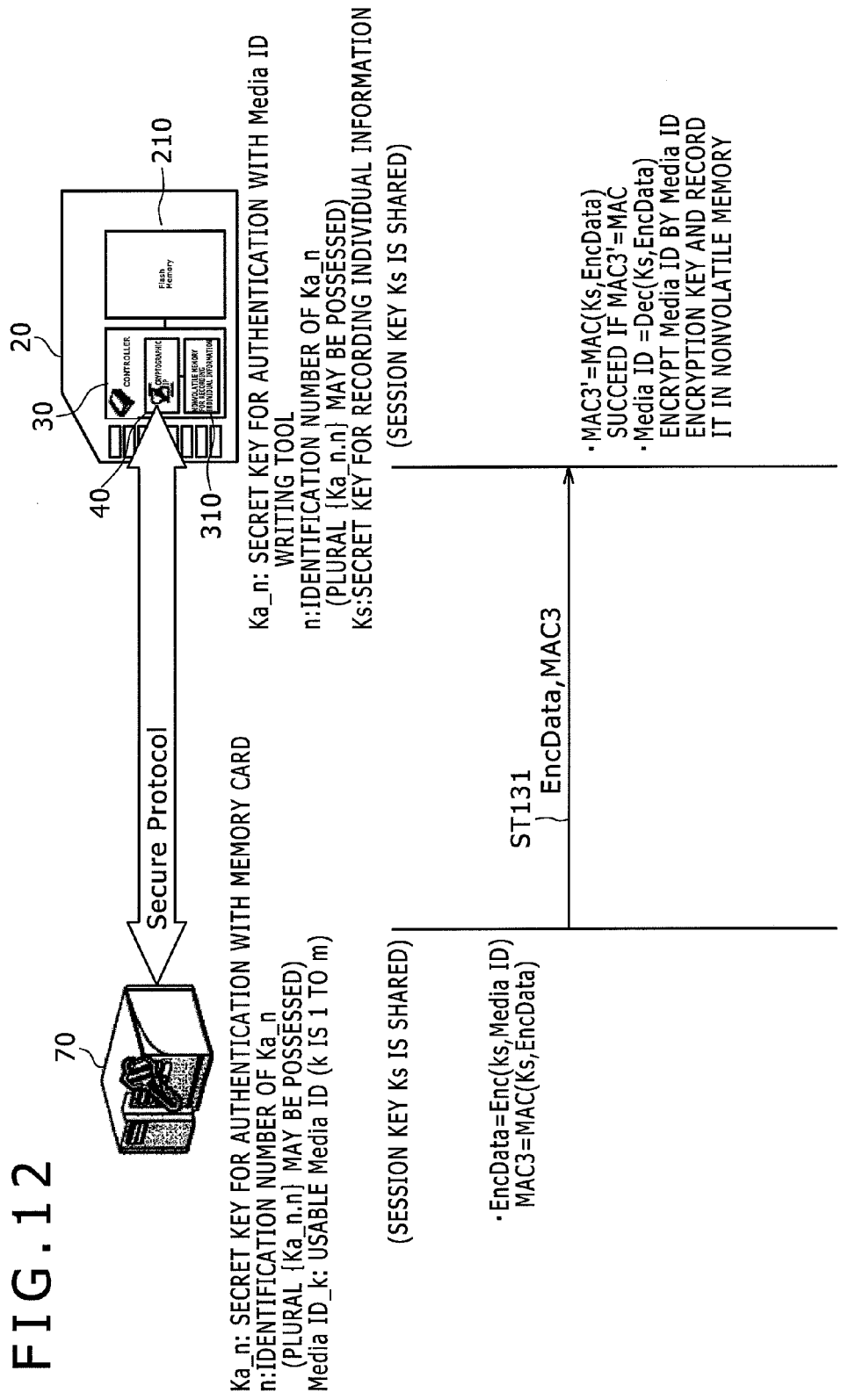
FIG. 12 is a diagram showing the flow of processing of encryption and transfer of individual information.

FIG. 12 is a diagram showing the flow of processing of the encryption and transfer of individual information.

Also in this case, the individual information writing tool 70 has Ka_n as the secret key for authentication with the memory card 20, n as the identification number of Ka_n (plural {Ka_n. n} may be possessed), and Media ID_k as the usable Media ID (k is 1 to m).

Similarly, the memory card 20 has Ka_n as the secret key for authentication with the individual information writing tool 70, n as the identification number of Ka_n (plural {Ka_n. n} may be possessed), and Ks as the secret key for Media ID recording.

In this case, the individual information writing tool 70 and the memory card 20 share the session key Ks.

The cryptographic processor 705 in the individual information writing tool 70 encrypts the individual information and the session key Ks and generates MAC3 to transfer the generated encrypted data and MAC3 to the memory card 20 (ST131).

In this case, the encrypted data is EncData=Enc(Ks, Media ID), and the MAC3 is MAC3=MAC(Ks, EncData).

The controller 30 of the memory card 20 carries out MAC verification.

The controller 30 determines that the success is achieved if MAC3'=MAC(Ks, EncData) and MAC3'=MAC.

The controller 30 decodes the Media ID as the individual information (Media ID=Dec(Ks, EncData)) and encrypts the Media ID by a Media ID encryption key, to record the encrypted Media ID in the nonvolatile memory 310.

Figure 13:
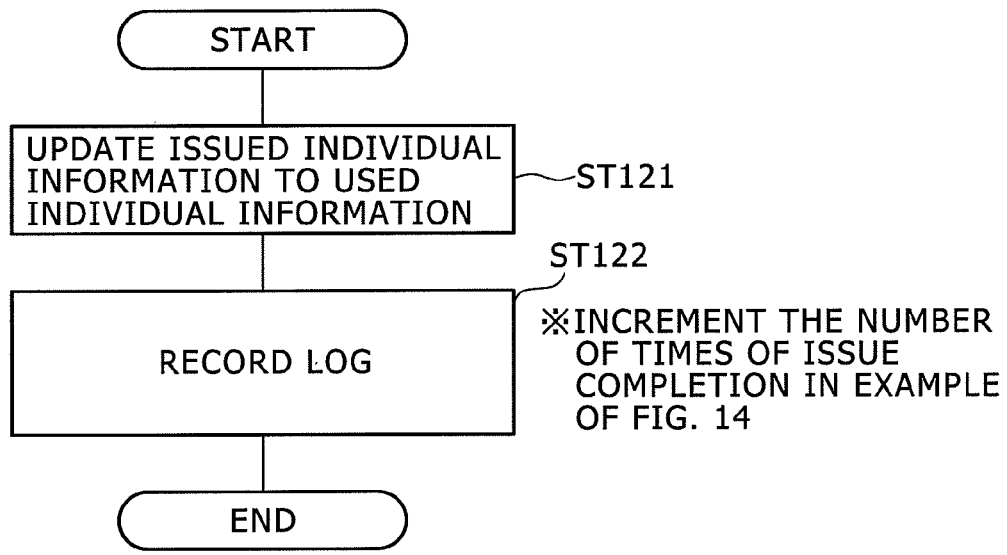
FIG. 13 is a diagram showing the flow of issue completion processing in the individual information manager according to the embodiment.

FIG. 13 is a diagram showing the flow of the issue completion processing by the individual information manager according to the present embodiment.

Figure 14:
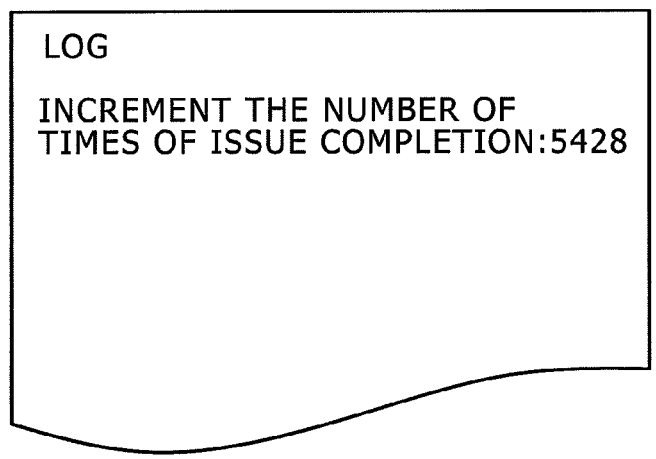
FIG. 14 is a diagram showing a configuration example of a log in a log recording part.

FIG. 14 is a diagram showing a configuration example of the log in the log recording part.

Upon receiving a notification of issue completion, the individual information manager 707 updates the individual information issued by the individual information recording part 708 to used individual information (ST121).

Subsequently, the individual information manager 707 records the log in the log recording part 709 (ST122).

In the example of FIG. 14, the individual information manager 707 increments the number of times of issue completion.

This collected log information is applied to e.g. charging of the cost of the issue of the individual information such as the Media ID.

<4. Second Configuration Example of Individual Information Writing Tool of Card Management Device>

Figure 15:
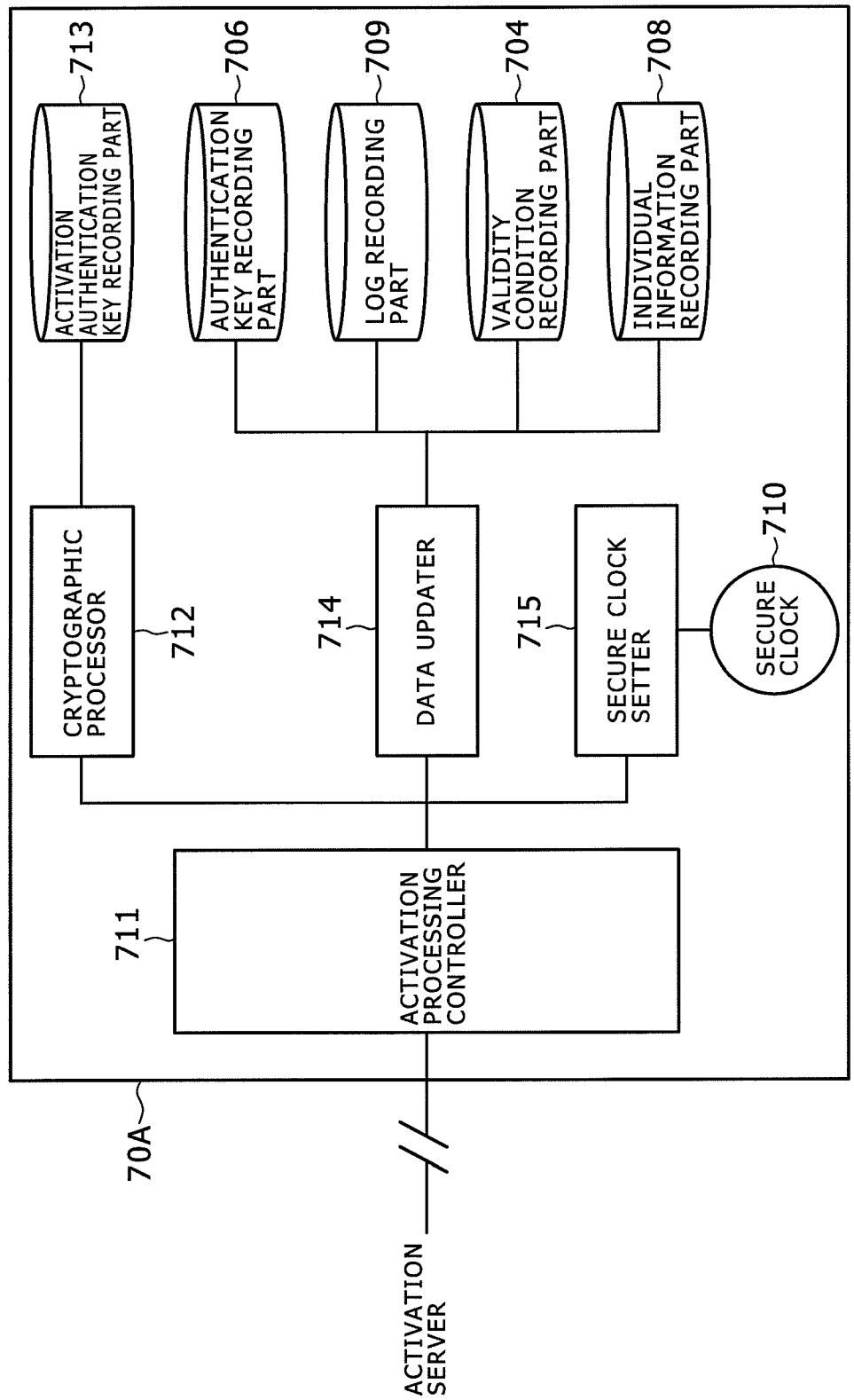
FIG. 15 is a block diagram showing a second configuration example of the individual information writing tool according to the embodiment of the present invention.

FIG. 15 is a block diagram showing a second configuration example of the individual information writing tool according to the embodiment of the present invention.

FIG. 15 shows a configuration example of activation function blocks of an individual information writing tool 70A.

In FIG. 15, the same constituent parts as those in the configuration of FIG. 4 are given the same numerals.

The individual information writing tool 70A of FIG. 15 has an activation processing controller 711, a cryptographic processor 712, an activation authentication key recording part 713, a data updater 714, and a secure clock setter 715.

The individual information writing tool 70A has the validity condition recording part 704, the authentication key recording part 706, the individual information recording part 708, the log recording part 709, and the secure clock 710 as a clock impossible to falsify from the external.

The activation processing controller 711 has a function to control communication with the activation server 50 via the network 60.

In the case of executing activation processing, the activation processing controller 711 issues an authentication start command to the cryptographic processor 712 so that the cryptographic processor 712 may execute authentication processing with the activation server 50.

The activation processing controller 711 receives the result of the authentication processing by the cryptographic processor 712. If the positive authentication result is obtained, the activation processing controller 711 executes communication processing with the activation server 50 via the network 60.

The data to be transmitted and received to and from the activation server 50 by the activation processing controller 711 are encrypted, and the received data is decrypted by the cryptographic processor 712.

The activation processing controller 711 issues a request for revocation information to the activation server 50 for example. When revocation information is transmitted, the activation processing controller 711 supplies the revocation information to the data updater 714 and makes it revoke (disable) an authentication key in the authentication key recording part 706.

The activation processing controller 711 issues a request for addition of an authentication key to the activation server 50 for example. When an additional authentication key is transmitted, the activation processing controller 711 supplies the additional authentication key information to the data updater 714 and makes it add the authentication key in the authentication key recording part 706.

The activation processing controller 711 issues a request for updating of the secure clock to the activation server 50 for example. When current time information is transmitted, the activation processing controller 711 supplies the current time information to the secure clock setter 715 and makes it set the secure clock 710.

The activation processing controller 711 issues a request for updating of the validity condition to the activation server 50 for example. When validity condition information is transmitted, the activation processing controller 711 supplies the validity condition information to the data updater 714 and makes it update the validity condition in the validity condition recording part 704.

If the clock is one whose error is small, it does not need to be updated in every communication.

The activation processing controller 711 issues a request for updating of individual information to the activation server 50 for example. When individual information is transmitted, the activation processing controller 711 supplies the individual information to the data updater 714 and makes it update the individual information in the individual information recording part 708.

The activation processing controller 711 has a function to issue a request for log acquisition to the data updater 714 and transmit the log information obtained as a result to the activation server 50.

It is also possible that the activation processing controller 711 is so configured as to have only the function to update the validity condition among the respective request functions for the revocation information, the authentication key addition, the secure clock updating, the validity condition updating, and the individual information updating.

In this case, if revocation etc. is required, it is also possible to replace the whole of the individual information writing tool 70A without activation.

The cryptographic processor 712 executes authentication processing with the activation server 50 upon receiving the authentication start command by the activation processing controller 711.

The cryptographic processor 712 executes the authentication processing with the activation server 50 in accordance with the authentication protocol with reference to the recorded data in the activation authentication key recording part 713, and informs the activation processing controller 711 of the authentication result.

The cryptographic processor 712 carries out authentication and session key generation in accordance with the authentication protocol.

The data updater 714 revokes (disables) an authentication key in the authentication key recording part 706 upon receiving the revocation information transferred from the activation server 50 via the activation processing controller 711.

The data updater 714 adds an authentication key in the authentication key recording part 706 upon receiving the additional authentication key information transferred from the activation server 50 via the activation processing controller 711.

The data updater 714 updates the validity condition in the validity condition recording part 704 upon receiving the validity condition information transferred from the activation server 50 via the activation processing controller 711.

The data updater 714 updates the individual information in the individual information recording part 708 upon receiving the individual information transferred from the activation server 50 via the activation processing controller 711.

The secure clock setter 715 sets the secure clock 710 upon receiving the current time information transferred from the activation server 50 via the activation processing controller 711.

[Activation Processing by Individual Information Writing Tool]

Activation processing by the individual information writing tool 70A according to the present embodiment will be described below in association with FIG. 16 to FIG. 19.

Figure 16:
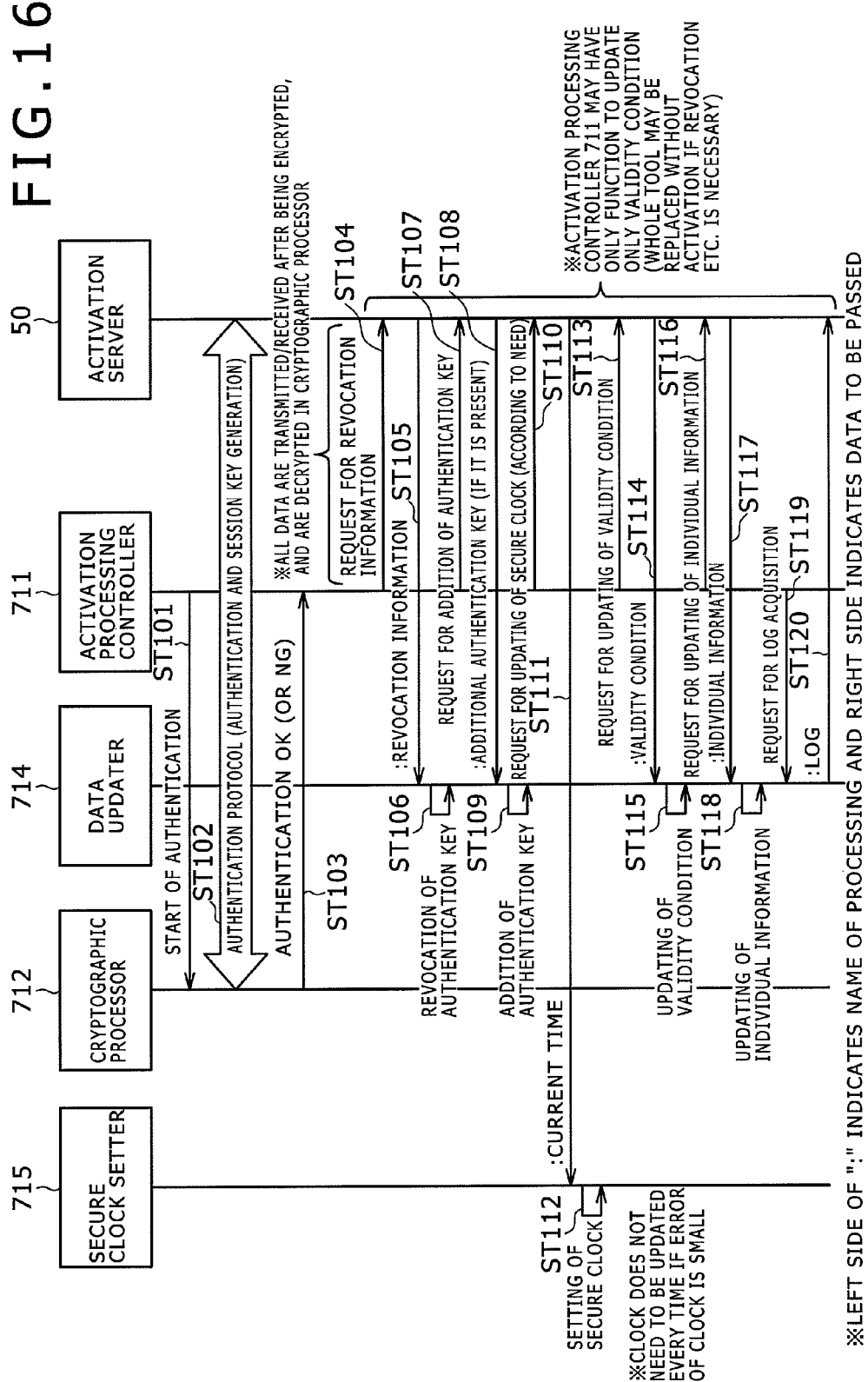
FIG. 16 is a diagram showing the flow of activation processing by the individual information writing tool according to the embodiment.

FIG. 16 is a diagram showing the flow of the activation processing by the individual information writing tool according to the present embodiment.

In the case of executing the activation processing, the activation processing controller 711 issues an authentication start command to the cryptographic processor 712 so that it may execute authentication processing with the activation server 50 (ST101).

Upon receiving the authentication start command by the activation processing controller 711, the cryptographic processor 712 executes the authentication processing with the activation server 50 in accordance with the authentication protocol with reference to the recorded data in the activation authentication key recording part 713 (ST102).

The cryptographic processor 712 carries out authentication and session key generation in accordance with the authentication protocol.

The cryptographic processor 712 informs the activation processing controller 711 of the authentication result (ST103).

Figure 17:
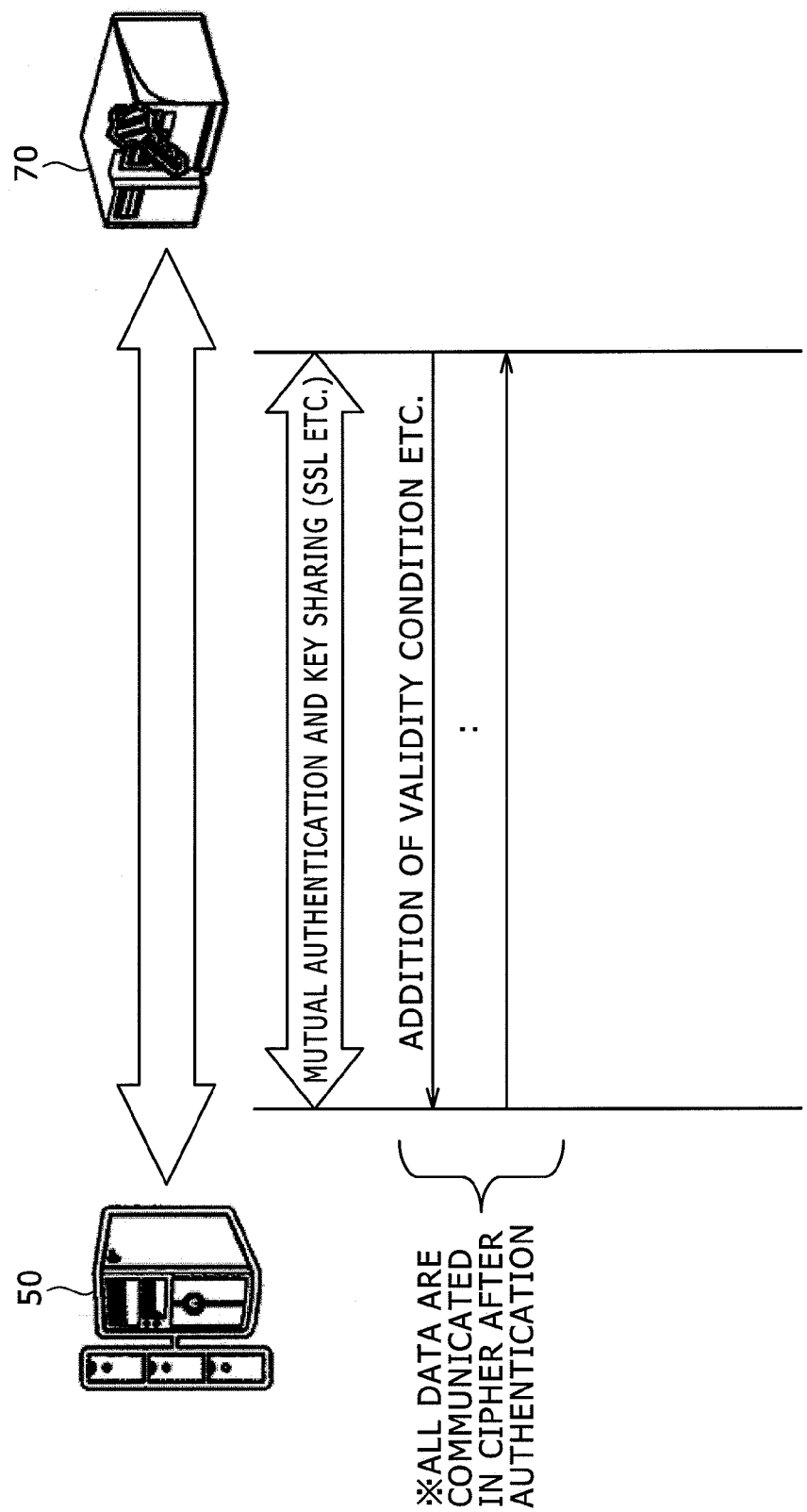
FIG. 17 is a diagram showing the flow of authentication between an activation server and the individual information writing tool according to the embodiment.

FIG. 17 is a diagram showing the flow of the authentication between the activation server and the individual information writing tool according to the present embodiment.

In this case, the individual information writing tool 70 and the activation server 50 are premised on mutual authentication and key sharing (SSL etc.).

After the authentication, all data are communicated in cipher between the individual information writing tool 70 and the activation server 50.

By the authentication, the activation server 50 is allowed to also recognize which individual information (Media ID) writing tool this writing tool is.

The activation processing controller 711 receives the result of the authentication processing by the cryptographic processor 712. If the positive authentication result is obtained, the activation processing controller 711 executes communication processing with the activation server 50 via the network 60.

The activation processing controller 711 issues a request for revocation information to the activation server 50 for example (ST104).

When revocation information is transferred, the activation processing controller 711 supplies the revocation information to the data updater 714 (ST105).

A format example of the data relating to the revocation information between the individual information writing tool 70 and the activation server 50 is shown below.

[Revocation Information Example]

```
<keys operation="revoke">
    <key number = "2" />
    <key hash = "3ACDFE729492A0188811AD342CBEAA" />
</keys>
```

As the key to be revoked, the number of the key is specified. In the above example, a number attribute is exemplified.

Alternatively, the key may be specified by the hash value of the key based on SHA-1 or the like. In the above example, a hash attribute is exemplified.

The data updater 714 revokes (disables) an authentication key in the authentication key recording part 706 upon receiving the revocation information.

Figure 18:
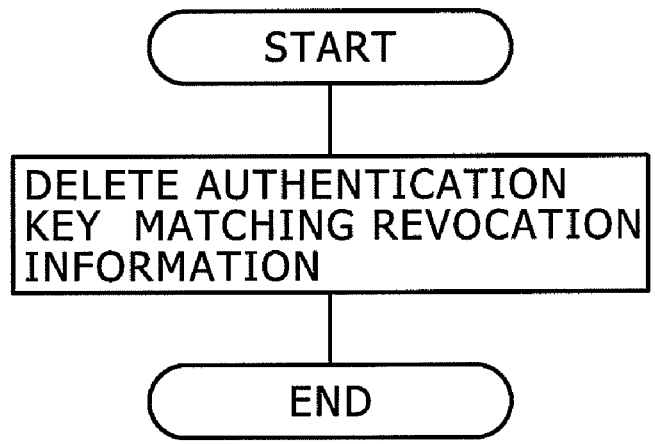
FIG. 18 is a diagram showing the flow of revocation processing by a data updater according to the embodiment.

FIG. 18 is a diagram showing the flow of the revocation processing by the data updater according to the present embodiment.

Figure 19:
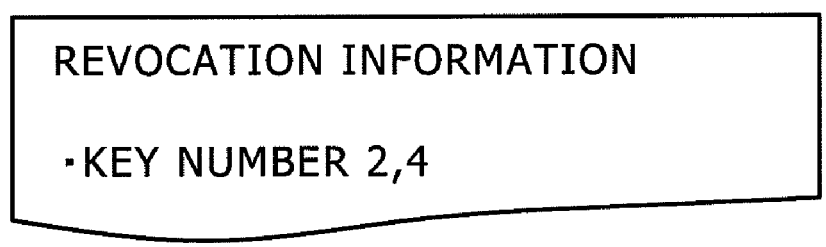
FIG. 19 is a diagram schematically showing a revocation information example.

FIG. 19 is a diagram schematically showing a revocation information example.

As shown in FIG. 18, the data updater 714 deletes the authentication key matching the revocation information from the recorded data in the authentication key recording part 706.

The activation processing controller 711 issues a request for addition of an authentication key to the activation server 50 for example (ST107).

When an additional authentication key is transferred, the activation processing controller 711 supplies the additional authentication key information to the data updater 714 (ST108).

The data updater 714 adds the authentication key in the authentication key recording part 706 (ST109).

A format example of the data relating to the additional authentication key between the individual information writing tool 70 and the activation server 50 is shown below.

[Additional Authentication Key Example]

```
<keys operation="add">
    <key number = "4">
        AD7E3901 ADCB38A9 001ACC34 00BE5452
    </key>
    <key number = "5">
        CC012AAE 843CBD91 EE32AFFE 33918CCD
    </key>
</keys>
```

The activation processing controller 711 issues a request for updating of the secure clock to the activation server 50 for example (ST110).

When current time information is transferred, the activation processing controller 711 supplies the current time information to the secure clock setter 715 (ST111).

The secure clock setter 715 sets the secure clock 710 based on the supplied current time information (ST112).

A format example of the data relating to the current time for setting the secure clock between the individual information writing tool 70 and the activation server 50 is shown below.

[Current Time for Setting Secure Clock]

```
<trustedtime>
2009-05-10T10:00:00Z
</trustedtime>
```

If the communication between the activation server 50 and the individual information writing tool 70 is based on the https (http over SSL) scheme, the Date field included in the header of the http may be utilized.

The activation processing controller 711 issues a request for updating of the validity condition to the activation server 50 for example (ST113).

When validity condition information is transferred, the activation processing controller 711 supplies the validity condition information to the data updater 714 (ST114).

The data updater 714 updates the validity condition in the validity condition recording part 704 (ST115).

A format example of the data relating to the validity condition between the individual information writing tool 70 and the activation server 50 is shown below.

[Validity Condition]

```
<validity>
    <expire>2010-10-10T23:59:59Z
    </expire>
    <maxcount>100000</maxcount>
</validity>
```

The activation processing controller 711 issues a request for updating of individual information to the activation server 50 for example (ST116).

When individual information is transferred, the activation processing controller 711 supplies the individual information to the data updater 714 (ST117).

The data updater 714 updates the individual information in the individual information recording part 708 (ST118).

A format example of the data relating to the individual information between the individual information writing tool 70 and the activation server 50 is shown below.

[Individual Information Example 1]

```
<cardinfolist>
    <cardinfo>
        <mediaid>00000000FFFFFFFF1234567800000001</mediaid>
        <cps>
            <secretkey>AC3248A190CbE91244AE229102FDDE0AC32
        </secretkey>
            <certificate>6IKqifyR2IK1gr2BQg0KICAgrGC6oLngsy5oLo
               4mQ40TggsaNbIKgsSCooLpIa0DQqIyI/jDQo=</certificate>
        </cps>
    </cardinfo>
    <cardinfo>
        <mediaid>00000000FFFFFFFF1234567800000001</mediaid>
        <cps>
            <secretkey>AC3248A190CbE91244AE2291E269DE0AC32
        </secretkey>
            <certificate>AIKqifyR2IK1gc2BQgeKICAgqqC643Lng2y5o1o
               g4gQ60TgSsaNbIKgsSCooLAIa0DqIDyI/jDQo=</certificate>
        </cps>
    </cardinfo>
    :
</cardinfolist>
```

This example 1 includes a Media ID and a secret key as the individual information.

[Individual Information Example 2 (Simple Format Including Only Media ID)]

```
<cardinfo>
    <mediaid>
        <prefix>00000000FFFFFFFF12345678</prefix>
    </mediaid>
</cardinfo>
```

In this example 2, a simple format including only a Media ID as the individual information is exemplified.

This example 2 shows an example of the case in which the Media ID may be issued continuously from Prefix+00000000 to Prefix+FFFFFFFF.

The activation processing controller 711 issues a request for log acquisition to the data updater 714 (ST119).

The activation processing controller 711 transmits log information obtained as a result to the activation server 50 (ST120).

As described above, the card management system 10 shown in FIG. 2 can preclude illegal manufacturing of the memory card 20.

The memory card manufacturer MM11 can be revoked by not carrying out updating at the time of communication with the activation server 50 or not providing the individual information writing tool 70 any more as shown in FIG. 2.

Revocation of the controller manufacturer CM11 will be described below in association with FIG. 20 and FIG. 21.

Figure 20:
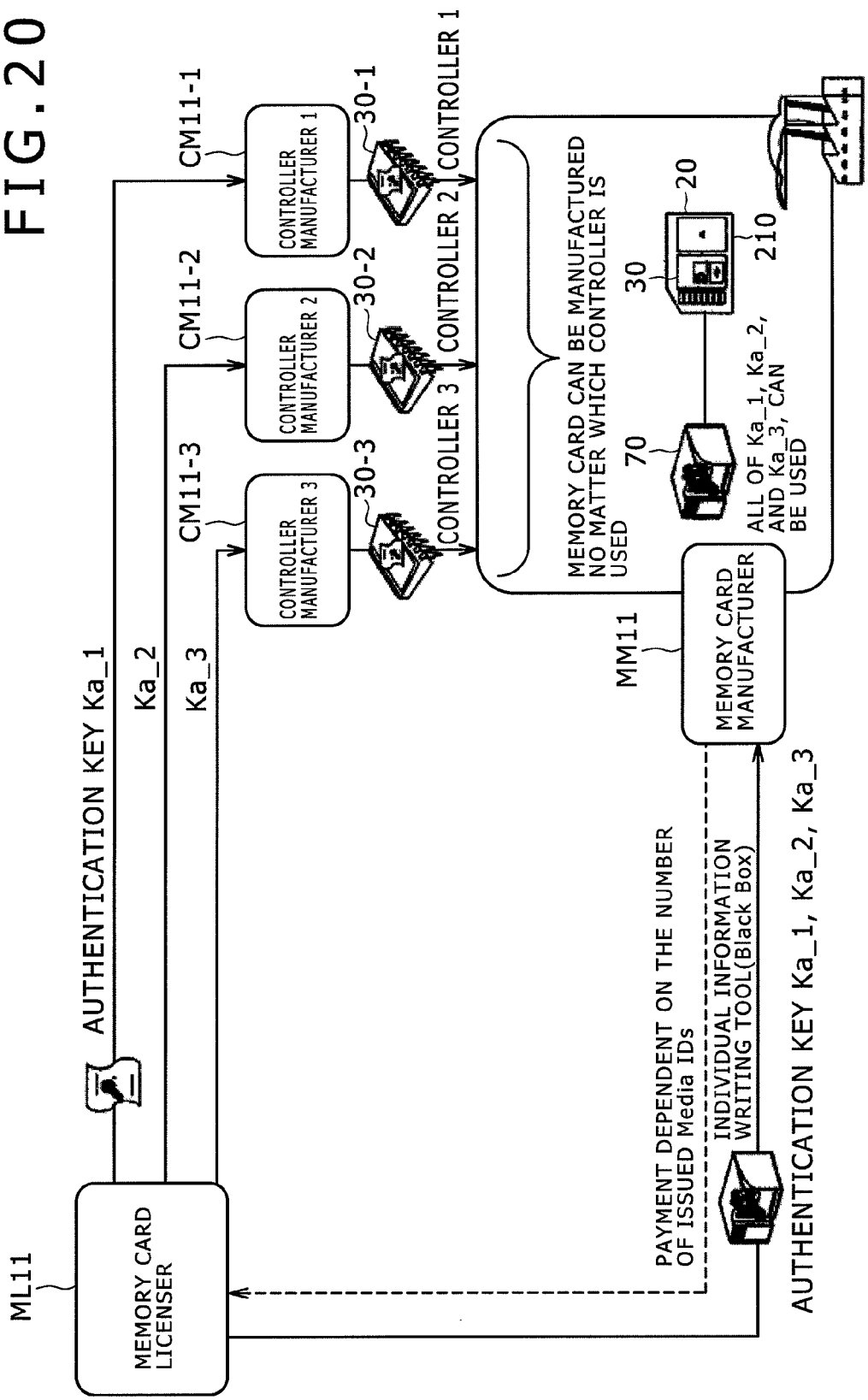
FIG. 20 is a diagram showing an authentication key operation example in which different authentication keys are given to plural controller manufacturers.

FIG. 20 is a diagram showing an authentication key operation example in which different authentication keys are given to plural controller manufacturers.

Figure 21:
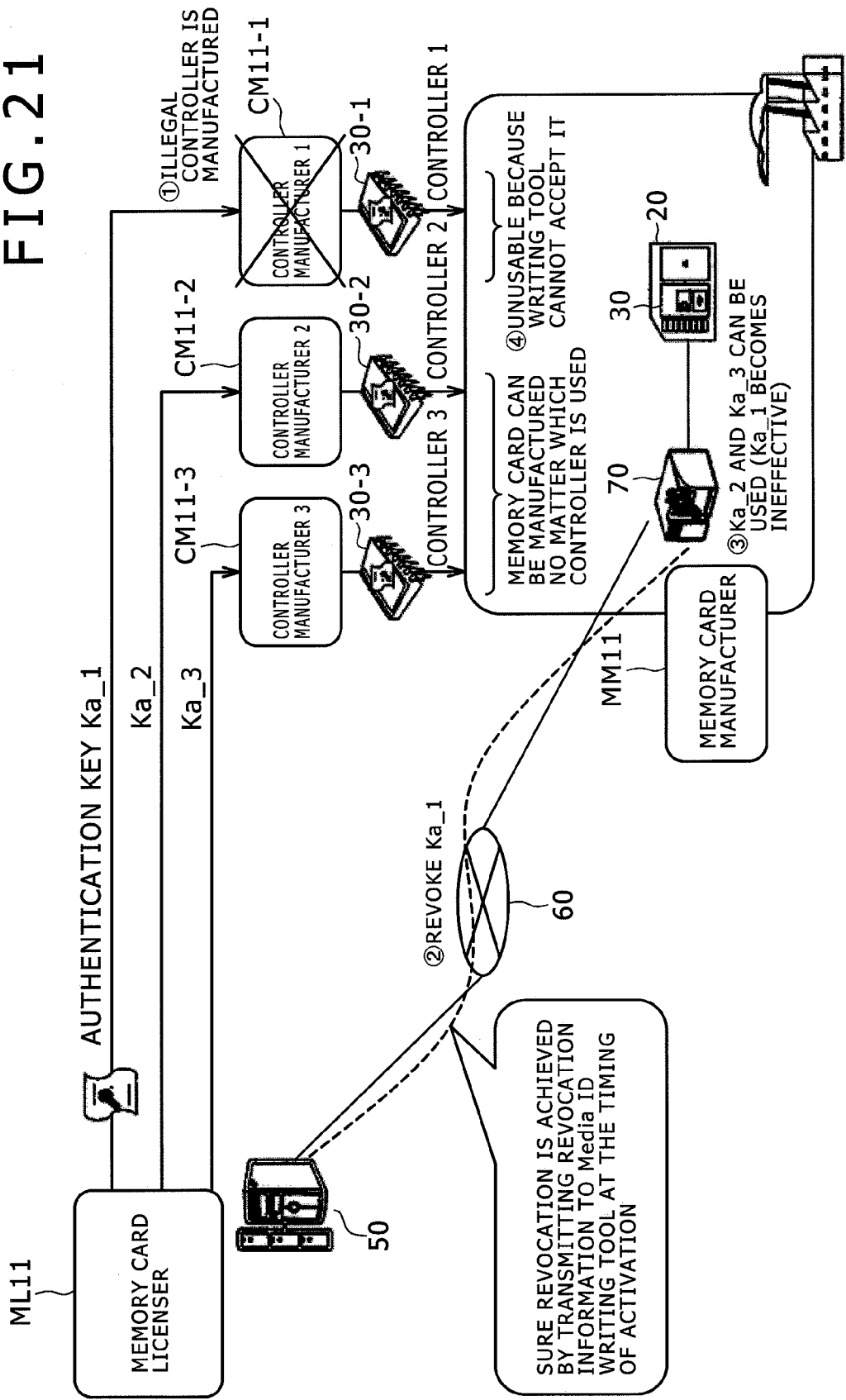
FIG. 21 is a diagram showing one example of the case in which a controller manufacturer is revoked in the system of FIG. 20.

FIG. 21 is a diagram showing one example of the case in which a controller manufacturer is revoked in the system of FIG. 20.

In the card management system of FIG. 20, the memory card licenser section ML11 supplies the cryptographic IPs 40 including authentication keys Ka_1, Ka_2, and Ka_3 different from each other to controller manufacturers CM11-1, CM11-2, and CM11-3 different from each other.

The controller manufacturer CM11-1 manufactures a controller 30-1. The controller manufacturer CM11-2 manufactures a controller 30-2. The controller manufacturer CM11-3 manufactures a controller 30-3.

The memory card manufacturer MM11 can manufacture the memory card no matter which controller of the controllers 30-1, 30-2, and 30-3 is used.

The individual information writing tool 70 is so formed as to be capable of using all of the authentication keys Ka_1, Ka_2, and Ka_3.

Suppose that, in such a memory management system, the controller manufacturer CM11-1 manufactures an illegal controller as shown in FIG. 21 for example.

In this case, revocation information of the authentication key Ka_1 is transferred from the activation server 50 to the individual information writing tool 70. At this time, the activation server 50 can achieve sure revocation by transmitting the revocation information to the individual information writing tool 70 at the timing of activation.

Then, the authentication key Ka_1 recorded in the authentication key recording part 706 is deleted by the data updater 714 in the individual information writing tool 70.

Thereby, in the individual information writing tool 70, the authentication key Ka_1 becomes ineffective whereas the authentication keys Ka_2 and Ka_3 can be used.

Therefore, the memory card manufacturer MM11 can manufacture the memory card no matter which controller of the controllers 30-2 and 30-3 is used.

In contrast, as for the controller 30-1 manufactured by the controller manufacturer CM11-1, the authentication key Ka_1 in the cryptographic IP thereof is not accepted by the individual information writing tool 70.

Consequently, the memory card manufacturer MM11 cannot use the controller 30-1.

[Application Example (Charging)]

The memory card licenser section ML11 can directly charge the fee from the memory card manufacturer MM11 depending on the number of written Media IDs (individual information).

The memory card licenser section ML11 can charge the fee only when the memory card manufacturer MM11 manufactures a memory card that uses an additional function such as the content protection function. This can avoid unnecessary charging.

For the controller manufacturer, it is unnecessary to add the extra cost to the price of the controller itself, and thus it is possible to reduce the price of the controller.

The present application contains subject matter related to that disclosed in Japanese Priority Patent Application JP 2009-139809 filed in the Japan Patent Office on Jun. 11, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A card management device comprising:
   a card device configured to include a controller on which a cryptographic IP is mounted in advance; and
   an individual information writing device configured to allow the card device to be connected to the individual information writing device in such a way that the card device is capable of data transfer to the individual information writing device, individual information assigned to the card device in advance being set in the individual information writing device, the individual information writing device being capable of writing the individual information to the card device connected to the individual information writing device, wherein
   a nonvolatile memory for individual information recording is formed in the controller of the card device, and the individual information given from the individual information writing device is written to the nonvolatile memory for individual information recording,
   authentication information for cryptographic authentication with the individual information writing device connected to the card device is set as the cryptographic IP in the controller, and the controller has a function to encrypt individual information given from the individual information writing device and write the individual information to the nonvolatile memory for individual information recording if a positive authentication result is obtained in authentication processing with the individual information writing device, and
   the individual information writing device has a function to execute the authentication processing with the controller of the card device connected to the individual information writing device, and transfers individual information of the card device to the controller of the card device to make the transferred individual information be written to the nonvolatile memory for individual information recording if a positive authentication result is obtained in the authentication processing.

2. The card management device according to claim 1, wherein
   the individual information writing device includes an individual information writing controller that controls writing of the individual information to the card device, and
   the individual information writing controller checks whether or not availability of individual information is present from use status of held individual information, and starts authentication to control authentication processing with the controller of the card device in accordance with an authentication protocol if the availability of the individual information is confirmed.

3. The card management device according to claim 2, wherein
   the individual information writing controller controls encryption of individual information to be transferred and carries out control of transferring the encrypted individual information to the card device and making the encrypted individual information be written to the nonvolatile memory if a positive authentication result is obtained.

4. The card management device according to claim 1, wherein
the individual information writing device includes a log recording part capable of management of the number of times of issue of individual information.

5. The card management device according to claim 1, wherein
the individual information writing device has a function to disable issue of individual information if the number of times of issue of the individual information reaches the number of times of issue set in advance.

6. The card management device according to claim 1, wherein
the individual information writing device includes an activation processing controller capable of giving and receiving at least activation information by communication, and
the activation processing controller has a function to control authentication processing with a communication counterpart in a case of executing activation processing.

7. The card management device according to claim 6, wherein
the activation processing controller executes communication processing by encrypted data and controls decryption of received data if a positive authentication result is obtained.

8. The card management device according to claim 6, wherein
the activation processing controller has a function to issue a request for revocation information and revoke (disable) corresponding authentication information if revocation information is transmitted.

9. The card management device according to claim 6, wherein
the activation processing controller has a function to issue a request for addition of authentication information and add additional authentication information if the additional authentication information is transmitted.

10. The card management device according to claim 6, wherein
the activation processing controller has a function to issue a request for updating of individual information and update received individual information if the individual information is transmitted.

11. A card management system comprising:
an activation server configured to be capable of communicating at least activation information;
a card device configured to include a controller on which a cryptographic IP is mounted in advance; and
an individual information writing device configured to allow the card device to be connected to the individual information writing device in such a way that the card device is capable of data transfer to the individual information writing device, individual information assigned to the card device in advance being set in the individual information writing device, the individual information writing device being capable of writing the individual information to the card device connected to the individual information writing device and being capable of communication with the activation server, wherein
a nonvolatile memory for individual information recording is formed in the controller of the card device, and the individual information given from the individual information writing device is written to the nonvolatile memory for individual information recording,
authentication information for cryptographic authentication with the individual information writing device connected to the card device is set as the cryptographic IP in the controller, and the controller has a function to encrypt individual information given from the individual information writing device and write the individual information to the nonvolatile memory for individual information recording if a positive authentication result is obtained in authentication processing with the individual information writing device, and
the individual information writing device has a function to execute the authentication processing with the controller of the card device connected to the individual information writing device, and transfers individual information of the card device to the controller of the card device to make the transferred individual information be written to the nonvolatile memory for individual information recording if a positive authentication result is obtained in the authentication processing.

12. The card management system according to claim 11, wherein
the individual information writing device includes an individual information writing controller that controls writing of the individual information to the card device, and
the individual information writing controller checks whether or not availability of individual information is present from use status of held individual information, and starts authentication to control authentication processing with the controller of the card device in accordance with an authentication protocol if the availability of the individual information is confirmed.

13. The card management system according to claim 12, wherein
the individual information writing controller controls encryption of individual information to be transferred and carries out control of transferring the encrypted individual information to the card device and making the encrypted individual information be written to the nonvolatile memory if a positive authentication result is obtained.

14. The card management system according to claim 11, wherein
the individual information writing device includes a log recording part capable of management of the number of times of issue of individual information.

15. The card management system according to claim 11, wherein
the individual information writing device has a function to disable issue of individual information if the number of times of issue of the individual information reaches the number of times of issue set in advance.

16. The card management system according to claim 11, wherein
the individual information writing device includes an activation processing controller capable of giving and receiving at least activation information by communication with the activation server, and
the activation processing controller has a function to control authentication processing with the activation server in a case of executing activation processing.

17. The card management system according to claim 16, wherein
the activation processing controller executes communication processing by encrypted data and controls decryption of received data if a positive authentication result is obtained.

18. The card management system according to claim 16, wherein
the activation processing controller has a function to issue a request for revocation information to the activation server and revoke (disable) corresponding authentication information if revocation information is transmitted.

19. The card management system according to claim 16, wherein
the activation processing controller has a function to issue a request for addition of authentication information to the activation server and add additional authentication information if the additional authentication information is transmitted.

20. The card management system according to claim 16, wherein
the activation processing controller has a function to issue a request for updating of individual information to the activation server and update received individual information if the individual information is transmitted.

* * * * *